(12) United States Patent
MaHoney

(10) Patent No.: US 7,711,233 B2
(45) Date of Patent: May 4, 2010

(54) FIBER OPTIC CABLE ENCLOSURE ASSEMBLY WITH SLIDE OUT TRAY

(75) Inventor: William G. MaHoney, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 11/275,453

(22) Filed: Jan. 5, 2006

(65) Prior Publication Data

US 2006/0280418 A1    Dec. 14, 2006

Related U.S. Application Data

(60) Provisional application No. 60/595,173, filed on Jun. 13, 2005.

(51) Int. Cl.
*G02B 6/42* (2006.01)
*H04B 10/12* (2006.01)

(52) U.S. Cl. .................. 385/135; 385/137; 398/200
(58) Field of Classification Search ............ 385/135, 385/137; 398/200, 214
See application file for complete search history.

(56) References Cited

U.S. PATENT DOCUMENTS

| 4,898,448 | A | * | 2/1990 | Cooper ..................... 385/92 |
| 5,966,492 | A | * | 10/1999 | Bechamps et al. .......... 385/135 |
| 6,195,493 | B1 | * | 2/2001 | Bridges ..................... 385/134 |
| 6,832,035 | B1 | * | 12/2004 | Daoud et al. ................ 385/135 |
| 2005/0111809 | A1 | * | 5/2005 | Giraud et al. ............... 385/135 |
| 2005/0129379 | A1 | * | 6/2005 | Reagan et al. .............. 385/135 |
| 2006/0198594 | A1 | * | 9/2006 | Beck ......................... 385/135 |

* cited by examiner

*Primary Examiner*—Jerry T Rahll
(74) *Attorney, Agent, or Firm*—Lewinski Law Group LLC

(57) ABSTRACT

An enclosure assembly for protecting and housing fiber optic cable within fiber optic equipment. The enclosure assembly includes a housing having an open end for detachably receiving a tray. The tray is configured to retain a portion of the length of the fiber optic cable in a coiled manner.

20 Claims, 3 Drawing Sheets

FIBER OPTIC CABLE ENCLOSURE ASSEMBLY WITH SLIDE OUT TRAY

CROSS-REFERENCE TO RELATED APPLICATIONS

This application claims priority to U.S. provisional application Ser. No. 60/595,173 filed Jun. 13, 2005, which is incorporated herein by reference.

TECHNICAL FIELD

The present invention relates to enclosures such as CATV nodes. More particularly, the present invention relates to cable management within an enclosure.

BACKGROUND OF THE INVENTION

In enclosures such as CATV nodes 90, for example Scientific-Atlanta's Gainmaker® or 1 GHz node, cable management is typically difficult as enclosures get smaller and capability expands. In outdoor enclosures this is particularly difficult due to the minimal amount of free space and the fact that the upper 92 and lower 94 housing halves are closed up together and compress the cables inside. A major problem is that cables get trapped or pinched between the two housing halves 92, 94 when the units are opened and closed. The cables become damaged and then the housing does not seal properly. What is needed is a means to secure cable of varying length within the sealed enclosure, but then permit any of the cables to be easily utilized when needed.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Figure 1:
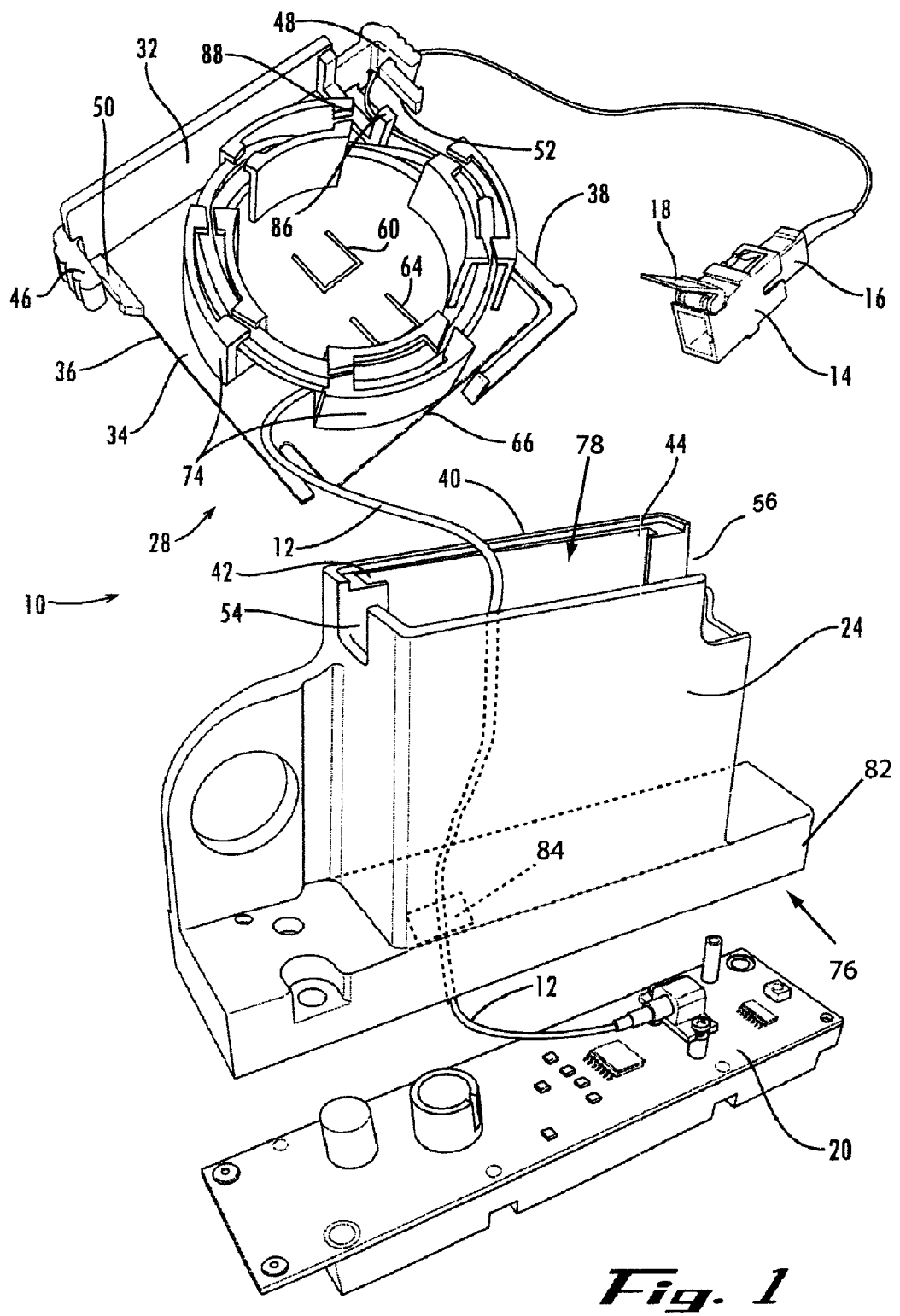
FIG. 1 illustrates a perspective view of a fiber optic cable enclosure assembly to be utilized with a fiber optic device according to one embodiment of the present invention.

The present invention is a fiber optic cable enclosure assembly 10 for protecting and housing fiber optic cable 12 having fiber optic cable connector 14 for laser aperture 16. The connector 14 has pivoting door 18 on its distal end. The enclosure assembly 10 may be used in combination with modular optical devices such as transmitters and receivers, which may be connected to an optical interface board. In FIG. 1, the enclosure assembly 10 is oriented over optics device 20 such that the fiber optic cable 12 passes into the bottom open end 76 of housing 24. The housing 24 may be mounted to the optics device 20 with fasteners, such as thumb screws or any other suitable means know to those skilled in the art, so that the fiber optic cable 12 extending from the optics device 20 extends through an opening 84 in a recessed portion 82 at the open end 76, and components on the optics device 20 extend within the recessed portion 82.

The enclosure assembly 10 also includes a tray 28 that may be pulled or slid out of the housing 24. In FIG. 1, the tray 28 has been pulled out of the housing 24 such that the fiber optic cable 12 extends out the top at a second open end 78 of the housing 24. The tray 28 includes a top portion 32 and a back portion 34 which are preferably mounted to one another along their edges and oriented substantially perpendicular to one another. Edges 36, 38 of the back portion 34 may be referred to as rails which may be received in slots 42, 44, respectively. The slots 42, 44 extend along the inside of the housing 24 along its sides and the back 40 of the housing 24. The top portion 32 also includes a pair of biasing portions 46, 48 which have finger portions 50, 52, respectively. The biasing portions 46, 48 are configured to be received in opening 54, 56, respectively, and when biased allow the finger portions 50, 52 to disengage the inside of the housing 24 so that the tray 28 may be at least partially removed from the housing 24.

Figure 2:
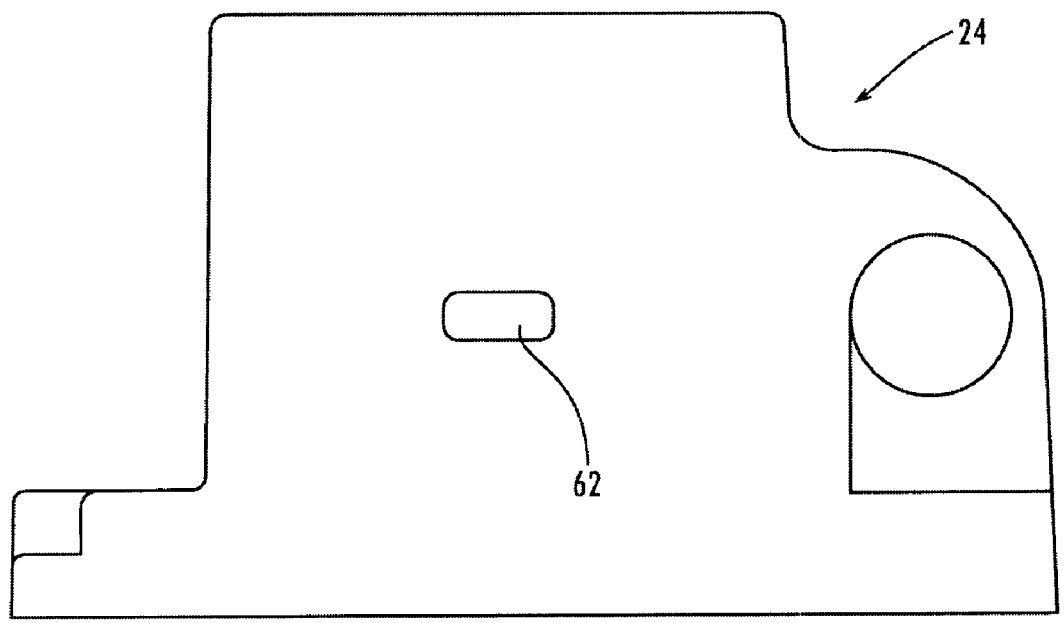
FIG. 2 illustrates a back view of a housing of the fiber optic cable enclosure of FIG. 1.

It is desirable at times to only allow the tray to be partially removed from the housing 24. The back portion 34 of the tray 28 may also include at least one biasing finger 60 to catch in a slot or opening 62 in the back 40 of the housing 24. The opening 62 is shown in FIG. 2. When the tray 28 is to be retained within the housing 24, the finger 60 catches in opening 62. Pressing on the finger 60 in opening 62 allows the tray 28 to be at least partially removed from the housing 60 to permit cleaning. Finger 60 may instead be a friction fit.

However, in some embodiments, the back portion 34 may include a second biasing finger 64 closer to a bottom edge 66 of the back portion 34 of tray 28 than the finger 60. In such case, once the finger 60 has been released from the opening 62 in the back 40 of the housing 24 and the tray 28 is starting to be removed from the housing 24, the finger 64 then becomes caught in opening 62 in the back 40 of the housing 24. By allowing the tray 28 to only be partially removed from the housing 24, the fiber optic connector 14 and laser aperture 16 is allowed to be accessed. If the finer optic cable 12 within the housing 24 needs to be accessed, the finger 64 can be pressed to release the finger 64 from the opening 62 so that the entire tray 28 may be removed from the housing 24 so that the entire spool of fiber optic cable 12 may be accessed. Fingers 62, 64 may be referred to as snap latches. Other combinations of fingers and openings or other suitable means for detachably retaining the tray 28 within the housing 24 and to limit the extent which the tray 28 may be removed may be used.

Figure 3:
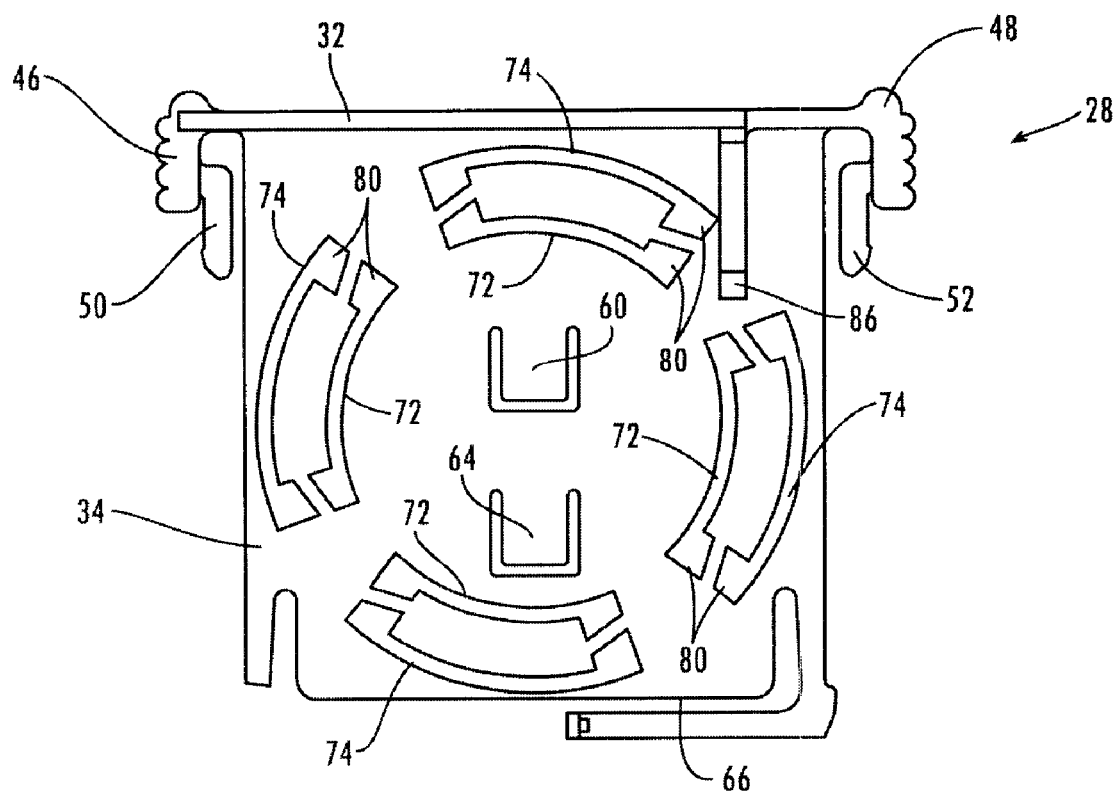
FIG. 3 illustrates a top view of a slide out tray of the fiber optic cable enclosure assembly of FIG. 1.
Figure 4:
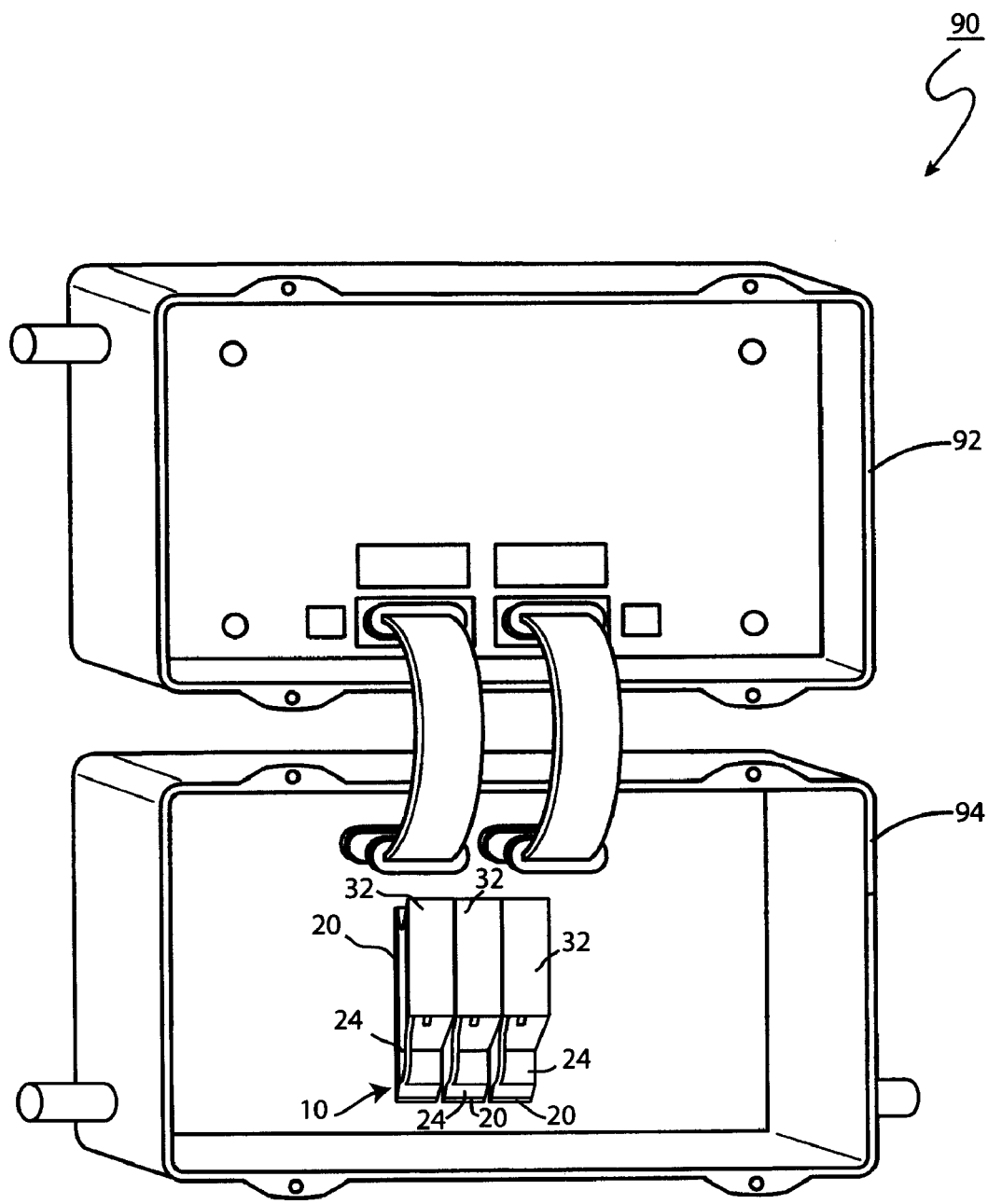
FIG. 4 illustrates a perspective view of a fiber optic node in an open positional with the enclosure mounted inside.

The tray 28 may also include one or more protruding portions which extend outward from the back portion 34 in order to control and retain spooled fiber optic cable 12. As shown in FIG. 3, protruding portions 72 are arranged to define an inner diameter and protruding portions 74 are arranged to define an outer diameter. The diameter of protruding portions 72 is spaced from the diameter of protruding portions 74 so that the fiber optic cable 12 may be received in between.

In an alternative embodiment, either or both of the pluralities of protruding portions 72, 74 may instead be continuous, thereby define a single substantially circular protruding portion. In another embodiment, one or more protruding portions may include biasing protuberances 80 which extend substantially perpendicular from the distal end of the protruding portion. Preferably, the protuberances extend between the two diameters of protruding portions 72, 74, as best shown in FIG. 3, so that the fiber optic cable 12 is retained between the two diameters of protruding portions 72, 74 and does not slip past the distal ends of the protruding portions 72, 74.

The connector 14 on one end of the fiber optic cable 12 may be retained in a position between the top potion 32 of the tray 28 and a finger portion 86 which defines a slot 88. When the laser aperture 16 is ready to be utilized in the enclosure, the tray 28 may be at least partially removed from the housing 24 so that the connector 14 can be removed from the slot 88 and at least a portion of the length of the fiber optic cable 12 can be removed from between the protruding portions 72, 74.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An enclosure assembly for protecting and housing fiber optic cable, said enclosure assembly for use within an enclosure for fiber optic equipment, said enclosure assembly comprising:
   a housing having a first open end, said first open end configured to directly couple to a modular optical transmitter mounted to the enclosure, said housing configured to cover said modular optical transmitter; and
   a tray configured to be received in said housing through a second opening at a second end of said housing, said tray having a first plurality of projection portions for coiling said fiber optic cable on said tray, and providing a path between said second opening and said first opening for passage of said fiber optic cable through said housing to connect with said modular optical transmitter.

2. The enclosure assembly of claim 1, further comprising:
   a recessed portion at said first open end to receive components of said modular optical transmitter within said housing; and
   a first opening in said recessed portion configured to receive a portion of said fiber optic cable extending from said modular optical transmitter therethrough;
   wherein said tray is detachably retained within said housing.

3. The enclosure assembly of claim 2, wherein rails of said tray are received within slots within said housing.

4. The enclosure assembly of claim 2 further comprising means for limiting the extent which said tray may be removed from said housing.

5. The enclosure assembly of claim 4 wherein said means comprises a first snap latch to engage an opening to prevent said tray from being completely removed from said housing.

6. The enclosure assembly of claim 5 wherein said first snap latch is positioned adjacent a bottom edge of said tray and is received in said opening in said housing when said tray is partial removed from said housing such that said fiber optic cable is accessible.

7. The enclosure assembly of claim 1 further comprising a second plurality of projection portions extending from said tray, said fiber optic cable to be coiled between said first and second plurality of projection portions.

8. The enclosure assembly of claim 1 further comprising a plurality of protuberances, one of said plurality of protuberances extending from a distal end of one of said first plurality of projection portions.

9. The enclosure assembly of claim 1, wherein said tray is movable with respect to said modular optical transmitter.

10. The enclosure assembly of claim 1 mounted within a CATV node wherein upper and lower housing halves of said CATV node may be opened and closed without said fiber optic cable becoming uncoiled from around projection portions extending from said tray.

11. The enclosure assembly of claim 1 mounted within a CATV node wherein upper and lower housing halves of said CATV node may be opened and closed without said fiber optic cable extending to the exterior of said enclosure assembly.

12. The enclosure assembly of claim 1 wherein a laser aperture of said fiber optic cable is connected within said enclosure for fiber optic equipment while a portion of the length of said fiber optic cable remains coiled within said enclosure assembly coupled to said modular optical transmitter.

13. An enclosure assembly for protecting and housing fiber optic cable, said enclosure assembly for use within an enclosure for fiber optic equipment, said enclosure assembly comprising:
   a housing having open opposite ends, one of said end adapted to couple to a modular optical transmitter; and
   a tray configured to be detachably received in said housing through said other open end, said tray for retaining said fiber optic cable in a coiled manner, and said tray providing a path for said fiber optic cable to pass through said housing from said one open end to said other open end in order to connect with said modular optical transmitter, said tray moveable with respect to said modular optical transmitter.

14. The enclosure assembly of claim 13 further comprising means for limiting the extent which said tray may be removed from within the housing.

15. The enclosure assembly of claim 13 wherein said housing is adapted for direct coupling to said modular optical transmitter.

16. A method for retaining fiber optic cable within a CATV enclosure to prevent said fiber optic cable from becoming damaged, said method comprising the steps of:
   coiling a length of fiber optic cable around a protrusion extending from a tray detachably retained within an opening at one end of a housing within an enclosure assembly;
   coupling a second end of the housing to a modular optical transmitter so a second opening at the second end of said housing of said enclosure assembly is over a modular optical transmitter mounted within said CATV enclosure;
   passing said fiber optic cable through said second end of said housing to a connection with said modular optical transmitter;
   moving said tray relative said modular optical transmitter; and
   accessing a connector of said fiber optic cable from said enclosure assembly.

17. The method of claim 16 further comprising the step of connecting a laser aperture of said fiber optic cable within said CATV enclosure while a portion of the length of said fiber optic cable remains coiled with said enclosure assembly over said modular optical transmitter.

18. The method of claim 16 further comprising the step of limiting the extent which a tray of said enclosure assembly may be removed from said housing of said enclosure assembly.

19. An enclosure assembly mounted within a CATV node for protecting and housing fiber optic cable, said enclosure assembly for use within an enclosure for fiber optic equipment, said enclosure assembly comprising:
   a housing having open opposite ends, one of said end adapted to mount to and cover a modular optical transmitter; and
   a tray configured to be detachably received in said housing through said other open end, said tray for retaining said fiber optic cable in a coiled manner, and said tray providing a path for passage of said fiber optic cable through said housing from one open end to said other open end in order to connect with said modular optical transmitter, wherein upper and lower housing halves of said CATV node may be opened and closed without said fiber optic cable extending to the exterior of said enclosure assembly.

20. The enclosure assembly of claim 19 wherein said tray is movable with respect to said modular optical transmitter.

* * * * *